E. A. FORD.
LIQUID PACKING MEANS FOR ENGINE PISTONS.
APPLICATION FILED OCT 6, 1920.
1,388,520. Patented Aug. 23, 1921.
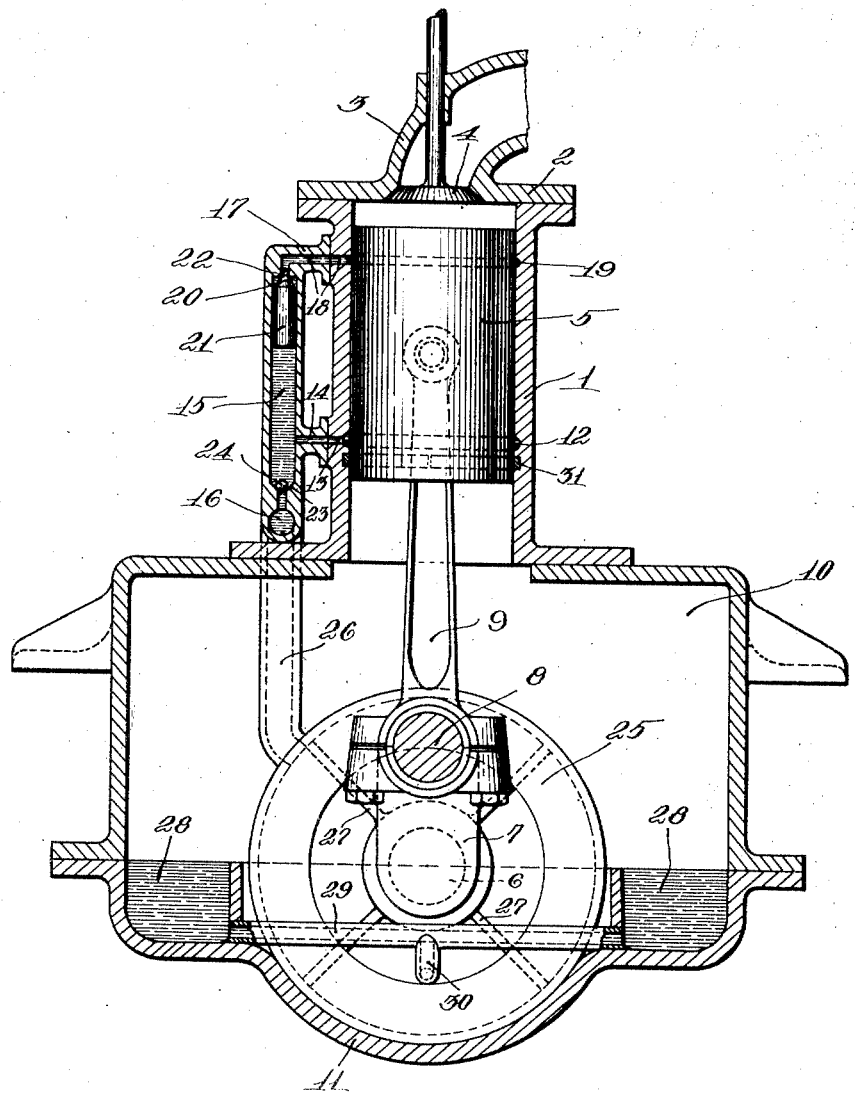
Inventor:
Eugene A. Ford
By Wright, Brown, Quinby & May
Attys.

UNITED STATES PATENT OFFICE.

EUGENE A. FORD, OF NEWTON, MASSACHUSETTS, ASSIGNOR TO R. E. D. ENGINE COMPANY, INC., OF NEW YORK, N. Y., A CORPORATION OF NEW YORK.

LIQUID PACKING MEANS FOR ENGINE-PISTONS.

1,388,520.  Specification of Letters Patent.  Patented Aug. 23, 1921.

Application filed October 6, 1920. Serial No. 415,176.

*To all whom it may concern:*

Be it known that I, EUGENE A. FORD, a citizen of the United States, residing at Newton, in the county of Middlesex and State of Massachusetts, have invented new and useful Improvements in Liquid Packing Means for Engine-Pistons, of which the following is a specification.

This invention relates to engine piston packing, and has particular reference to engines in which pure air is compressed in the engine cylinder prior to admission of fuel. The object is to provide liquid packing for the purpose of making a perfect seal between the piston and cylinder wall, and to combine therewith a reservoir of the packing liquid to replenish any leakage which might occur, and to combine also means for preventing the packing liquid from being blown back into the source of replenishment by pressure of the gas within the cylinder.

The class of engines above referred to, in which air is compressed prior to admission of fuel, develops extremely high pressures of compression and combustion. To pack the pistons of such engines by packing rings in such a way as to prevent excessive loss of pressure, involves a large number of rings and great piston mass. The liquid packing means of my invention is designed to supplant the metallic piston rings and to make a perfect seal against leakage of gas between the piston and cylinder wall. The invention is useful also in other internal combustion engines and machines where a piston working in a chamber is pressed upon by gas at high pressure.

The single figure of the drawing is a sectional view through the axis of one of the cylinders and across the crank case of an internal combustion engine of the high compression type, having applied thereto the packing means in which my invention is particularly embodied.

I will proceed with the detailed description of the embodiment shown in this drawing upon the assumption that the engine shown is an internal combustion engine and that the packing liquid used is the oil provided in the crank case of the engine for lubrication.

In the drawing, 1 represents one of the cylinders of the engine, 2 the cylinder head, 3 a passage through such head for intake of air and exhaust of spent gases, 4 a valve controlling the single admission and exhaust port, 5 a piston working in cylinder 1, 6 the crank shaft, 7 one of the cranks having a pin 8, 9 the connecting rod by which piston 5 is connected with the crank pin 8, and 10 the crank case inclosing the crank shaft and containing in its depressed central bottom part 11 a quantity of oil for lubrication. As thus far described, the engine may be considered typical of any internal combustion engine, whether of the high compression or low compression type and whether operating on the four-stroke cycle or the two-stroke cycle.

The total length of the piston is greater than the length of its stroke, a usual feature in this class of engines, and in the cylinder wall is an annular groove 12 so located that it is always covered by the piston. This groove is designed to contain a quantity of the lubricating oil, and is large enough to contain a constantly replenished body of oil under sufficient pressure to prevent escape of the working fluid. It is in connection through a passage 13 with a branch 14 from a pipe 15 which rises from a main 16 and has an upper branch 17 connecting by a passage 18 through the cylinder with an annular groove 19 in the interior wall of the cylinder in a location where it is covered by the piston when the latter is at and near the head end of its stroke, but is uncovered at other times. A combined valve 20 and float 21 is confined in the pipe 15. When said pipe, which may for the convenience of this description be referred to as the standpipe, is full of oil the float rises until the valve 20 on its end closes against the seat 22 which surrounds the entrance to the passage 18. In the lower part of the standpipe 15 is a valve seat 23 wherewith a check valve 24 coöperates to prevent flow of oil back from the standpipe into the main. The interior of the standpipe is in effect an oil reservoir rising above the level of the groove 12 and adapted to supply oil thereto faster than the oil can leak therefrom.

In some convenient part of the crank case, preferably at one end thereof, is located a centrifugal pump having a casing 25 fixed in position and connected through a delivery pipe 26 with the main 16, and a rotor 27 which is either fast to the crank shaft or is driven thereby. Reservoirs 28 are provided in the crank case adjacent to the pump at a level above the normal oil level in the crank case, and are kept filled with oil by the splash of the revolving cranks. A cross connecting pipe 29 and a branch 30 therefrom conduct oil from the reservoirs 28 to the casing of the pump.

A packing ring 31 is held in a groove in the cylinder wall surrounding the piston close to the oil packing groove at the crank case side of the latter. This packing ring is provided to minimize leakage of oil from the groove into the crank case, and is unnecessary where the piston fits the cylinder closely enough in itself to prevent rapid leakage.

It will now be apparent that oil from the reservoirs 28 flowing to the centrifugal pump is supplied by the pipe 26 and main 16 to the standpipes of all the cylinders, and by the standpipe of each cylinder to the packing groove 12 of that cylinder. Any oil which may leak past the piston and the packing ring 31, when such ring is provided, falls back into the crank case, from which it may again be lifted by the pump. The capacity of the pump is great enough to supply a greater quantity of oil than the leakage in all the cylinders supplied by the one pump, under proper working conditions. Thus, the standpipes are kept full and a supply of oil is maintained in each more than great enough to replenish the leakage from the communicating packing groove. The float controlled valve 21 prevents oil from flooding the cylinder by flowing through the passage 18.

Gases under high pressure which may leak between the piston and cylinder wall above the groove 12 are arrested and checked by the ring of oil contained in said groove, which makes perfect contact with the piston and cylinder wall at all points in a zone wholly surrounding the piston. The packing liquid can not be blown away by the gas pressure into the crank case, because although some of it may leak out, the leakage is instantly compensated for by the reserve supply in the standpipe 15, from which the oil flows by gravity and because the excess capacity of the pump replenishes such reserve supply at times when low pressure conditions exist in the standpipe. Neither can the oil be blown back into the standpipe, because the groove 19 and the passage 18 admits the full working pressure of the cylinder gases upon the column of oil in the standpipe, equalizing the back pressure applied by the gases upon oil in the groove 12, wherefore gravity is enabled to keep the packing ring of oil constantly replenished, whatever may be the cylinder pressure, equally when the pressure fluctuates as well as when it is constant. Nor can the oil be forced from the standpipe back to the pump, because the check valve 24 prevents. Thus the piston is securely packed and leakage of the working gases absoltuely stopped by a substantially frictionless packing, since the ring 31, being designed merely to minimize leakage of oil and not to prevent it, need have only a close fit about the piston without any friction-causing pressure.

It will be understood that various modifications in the form and arrangement of the combination here described, and in the structure and form of the various elements thereof, may be made without departure from the protection which I claim for this invention. For example, the float 21 need not be of less specific gravity than the oil, but may be made as a piston of material heavier than oil, but fitting so closely in the standpipe as to prevent leakage of oil past it, while capable of sliding freely enough in the standpipe. Then by reason of the confinement of the body of oil beneath the piston, such piston in effect floats upon the oil, and is the equivalent of a float which is lighter than oil and is included within the meaning of the word "float" as used in the following claims. But in the case of a float lighter than the oil, such float may have other forms than that of a piston approximating to the diameter of the standpipe, and may be guided either by the standpipe walls or by other means and in other ways.

Likewise modification may be made in the position of the passage 18, its direction, and the distance of the valve 20 from the cylinder. The groove 19 into which the passage 18 opens may be omitted without impairment of the function which is performed by the passage 18 of admitting the cylinder pressure on top of the oil reserve in the standpipe. The utility of the groove 19 is additional to that function, in that, being placed where it is over-run by the head end of the piston, it acts to remove oil which may be carried in a film by the piston from the packing groove. The oil thus scraped off by the edges of the groove 19 is forced by the gas pressure from such groove through the passage 18 into the standpipe, and is not allowed to work up to the head of the piston where it would burn.

Besides preventing leakage of the high pressure working fluid, my invention makes possible certain secondary advantages, particularly light weight and low cost of the piston. Since the piston is no longer required to be equipped with metal packing rings, the mass and weight necessary for carrying and securely holding such packing rings may be done away with, but instead, only the extreme head end of the piston and that part which carries the wrist pin need be made heavy enough to be rigid in order to sustain the thrust of the working fluid and connecting rod without distortion, and the balance of the piston may be made of thin and light material such as swaged metal tubing. The piston likewise is made without openings in its sides, for such openings would permit escape of the gas to a greater or less degree, and therefore the ends of the wrist pin, or any other connection which may be made between the piston and a connecting rod or a thrust rod, are covered and the entire piston surface is made imperforate and gas tight.

What I claim and desire to secure by Letters Patent is:

1. A piston packing means comprising in combination with a piston and an inclosing wall within which said piston is reciprocatable and is acted upon by fluid pressure, said wall having a groove surrounding the piston, means for maintaining a constant supply of packing liquid in said groove to compensate for leakage of the liquid therefrom, and means for applying the said fluid pressure externally upon the packing liquid.

2. In combination with a cylinder and a piston adapted to reciprocate therein and to sustain fluid pressure, the cylinder having a groove encircling the piston, a standpipe outside of the cylinder communicating with said groove and adapted to contain packing liquid in sufficient quantity to fill said groove and feed replenishment thereto, means adapted to deliver the liquid to said standpipe at a rate greater than required to replenish the liquid in said groove, and a passage between said standpipe and the interior of the cylinder arranged to transmit the fluid pressure within the cylinder upon the liquid in the standpipe.

3. A piston packing comprising the combination with a cylinder and a piston working therein, said cylinder having a groove encircling the piston so located, and the piston having such length greater than the length of its stroke, that it always covers said groove, an external reservoir in communication with said groove and adapted to hold packing liquid for gravity feed thereof into the groove, means for delivering liquid to said reservoir to compensate for leakage of the liquid between the piston and cylinder wall, the reservoir being inclosed and adapted to withstand an unbalanced internal fluid pressure, and a pressure transmitting connection between said reservoir and the cylinder adjacent to the head end of the latter.

4. In an internal combustion engine having a cylinder, piston, and crank case containing lubricating oil, the cylinder having a groove surrounding the piston in a location to be always covered by the piston, a standpipe in connection with said groove, and a pump arranged and operated to transfer oil from said crank case into said standpipe, whereby such oil is adapted to flow into such groove and seal the piston against leakage of the working fluid.

5. The combination with an internal combustion engine having a cylinder, crank case, and piston working in the cylinder, the cylinder having an internal groove surrounding the piston and arranged to be covered at all times by the piston and the crank case containing a body of lubricating oil, a standpipe in communication with said groove and having a second communication with the cylinder arranged to receive the pressure of the working fluid therein, a pump in the crank case adapted to take oil therefrom and connected for delivery of such oil to the standpipe, and a float valve adapted to open and close the aforesaid second communication and being arranged for actuation by the oil in the standpipe to prevent flow of the oil through said second communication.

6. An internal combustion engine comprising a cylinder, crank case, piston and crank shaft operatively arranged and connected, the crank case adapted to contain a quantity of lubricating oil, a groove in the interior of the cylinder wall surrounding the piston for reception of oil to pack the piston, a standpipe in connection with the said groove and rising to a height above the level of the groove, whereby to contain a reserve supply of oil to be fed by gravity to the groove, a centrifugal pump within the crank case driven by the crank shaft and having its discharge connected with said standpipe and being adapted to deliver oil thereto in excess of the normal feed therefrom to the packing groove, and means for applying upon the oil in the standpipe a pressure substantially balancing that exerted by the working fluid upon the packing oil tending to displace such oil from the groove.

7. An internal combustion engine comprising a cylinder, crank case, piston and crank shaft operatively arranged and connected, the crank case adapted to contain a quantity of lubricating oil, a groove in the interior of the cylinder wall surrounding the piston for reception of oil to pack the piston, a standpipe in connection with the said groove and rising to a height above the level of the groove, whereby to contain a reserve supply of oil to be fed by gravity to the groove, a centrifugal pump within the crank case driven by the crank shaft and having its discharge connected with said standpipe and being adapted to deliver oil thereto in excess of the normal feed therefrom to the packing groove, and reservoirs within the crank case constructed to hold oil at a higher level than the normal level of said body of oil and being connected to discharge into the intake of the pump.

8. A packing means for an engine piston comprising a groove in the wall surrounding said piston, an external reservoir for packing liquid connected with said groove, means for delivering liquid to said reservoir, a check valve for preventing return of the liquid to its delivering means, and means for maintaining upon the liquid in said reservoir a pressure substantially balancing the tendency of the working pressure in the engine to blow the packing liquid from the groove back to the reservoir.

9. An internal combustion engine including a cylinder and piston, the cylinder having a groove in its wall surrounding the piston in a position where it is covered by the latter at all stages of the piston travel, a reservoir containing a supply of liquid packing material in communication with said groove and adapted to feed such liquid thereto by gravity, a second groove in the cylinder arranged to be crossed by the piston head when approaching and receding from the cylinder head, the second groove being adapted to scrape from the sides of the piston liquid which may adhere thereto, and a passage leading from the said second groove to the reservoir.

10. An internal combustion motor comprising a cylinder, a piston working therein, a packing groove adapted to contain liquid formed in a zone of the cylinder wall which is covered by the piston at all stages of its travel, a standpipe having connection with said groove and rising above the same, whereby to feed its content of liquid packing material by gravity into the groove, a connection from the upper part of said standpipe to the cylinder between said groove and the head of the cylinder, whereby pressure of the gas in the cylinder is applied upon the liquid contents of the standpipe, a feeding means continuously supplying liquid packing material to said standpipe, a check valve for preventing return of the material toward the feeding means and a valve coöperative with said passage between the standpipe and cylinder arranged to be lifted by the rise in liquid in the standpipe to close said passage.

In testimony whereof I have affixed my signature.

EUGENE A. FORD.